April 21, 1964     E. T. SHERWOOD ETAL     3,130,359
BATTERY CHARGING CIRCUIT WITH SATURABLE REACTOR CONTROL
Filed Sept. 1, 1960
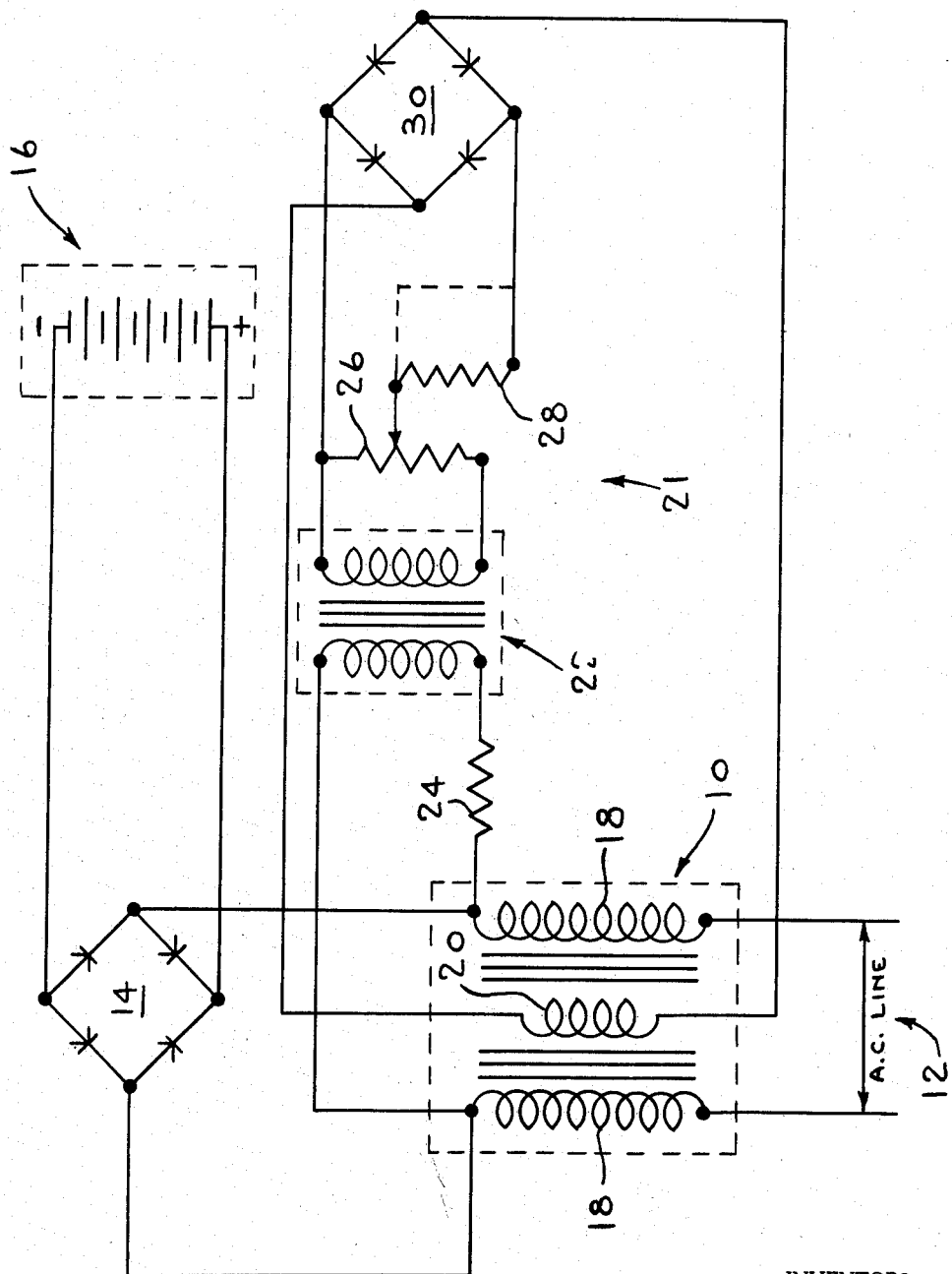
INVENTORS
EDWIN T. SHERWOOD
HERBERT C. GANIERE
BY
John W. Michael
ATTORNEY

United States Patent Office 3,130,359
Patented Apr. 21, 1964

3,130,359
BATTERY CHARGING CIRCUIT WITH SATURABLE REACTOR CONTROL
Edwin T. Sherwood, Bayside, and Herbert C. Ganiere, Milwaukee, Wis., assignors to Globe-Union Inc., Milwaukee, Wis., a corporation of Delaware
Filed Sept. 1, 1960, Ser. No. 53,387
4 Claims. (Cl. 320—39)

This invention relates to an improved battery charging circuit particularly adapted for forming a plurality of green storage batteries. A "green" storage battery means a battery which is unformed or in a condition prior to the initial charging of the battery.

In forming a green storage battery (and in recharging a formed battery) it is important that the amount of charge put into the battery be controlled. Since the amount of charge is equal to the current times the time, the amount of charge can be controlled by keeping the current constant and varying the charge time by means of a suitable timing device. The problem in such an arrangement is to maintain the charging current constant despite certain circuit variations such as the change in battery terminal voltage during formation thereof.

The principal object of this invention therefore is to provide a relatively simple and effective charging circuit which will maintain a substantially constant current charge rate irrespective of changes in battery voltage.

Another object is to provide such a circuit in which the effect of variations in line voltage will be kept to a minimum.

Another object is to provide a charging current in which the current output can be readily adjusted to the desired amount.

These objects are attained by a battery charging circuit comprising a main charging circuit and a control circuit for the main charging circuit. The main charging circuit includes a saturable reactor connected to a source of alternating current and a rectifier adapted to convert the alternating current output of the saturable reactor into direct current for charging a battery. The saturable reactor includes at least one load coil and a direct current control coil for the load coil.

The control circuit for the main charging circuit is connected to the output of the saturable reactor and includes a control transformer and a control rectifier in the secondary of the control transformer to provide direct current to the saturable reactor control coil. The control circuit is adapted to increase the impedance of the saturable reactor load coils when the voltage at the battery terminals decreases and to decrease the impedance when the battery voltage increases. The control transformer in the control circuit is designed to operate with core flux densities which run into the saturation region. With this arrangement the control current flowing in the control coil of the saturable reactor is relatively insensitive to changes in the A.C. line voltage. Thus, the impedance of the saturable reactor tends to remain constant under conditions of varying A.C. line voltage. A potentiometer is connected in the secondary of the control transformer to facilitate adjustment of the current output from the saturable reactor and a dropping resistor is connected in the primary of the control transformer to provide the proper control action.

Other objects and advantages will be pointed out in, or be apparent from the specification and claims, as will obvious modifications of the single embodiment shown in the drawing, in which:

The drawing shows a circuit diagram of a battery charger constructed in accordance with the present invention.

Referring now to the drawing in detail, the charging circuit includes a saturable reactor 10 having a source 12 of A.C. current with its output connected to a full-wave rectifier bridge 14 which provides direct current for charging a battery 16. Although only one battery is shown in the drawing it should be understood that a plurality of batteries can be formed at the same time. Reactor 10 includes a pair of load coils 18, 18 connected in series one in each side of the line and a control coil 20 connected to a control circuit 21 which will be described in detail hereinafter. The load coils are connected in opposite sides of the line to protect the elements of rectifier bridge 14 against damage which might otherwise result due to a short circuit to ground in the charging current.

No charging current will flow in the circuit until the alternating current line voltage exceeds the battery load voltage. When this occurs current will flow and is limited only by the impedance of saturable reactor 10, the internal resistance of the batteries and the resistance of the connecting wires. Ordinarily, for lead-acid storage batteries, the resistance in the charge circuit does not exceed a few tenths of an ohm. Thus, at current values associated with battery charging (about 3 to 15 amps) the voltage rise at the battery terminals or at the output terminals of reactor 10 is very small. The polarity of the voltage at the output of reactor 10 reverses with each reversal of line voltage. Thus, in effect, the output terminals of reactor 10 become a source of alternating current whose peak voltage amplitude is approximately equal to the battery voltage. The amplitude characteristic of the alternating current output of the reactor is used in a unique manner to maintain a relatively constant charge current under relatively wide variations in battery terminal voltage.

This is accomplished by a control circuit 21 for saturable reactor 10 which includes a control transformer 22 with a dropping resistor 24 in its primary; a potentiometer 26 for manual control in its secondary; a fixed resistance 28 in the secondary for limiting maximum control current output; and a control rectifier bridge 30 in the secondary to provide direct current to the control coil 20 of the saturable reactor 10.

The manual setting for the desired charging current output is made by adjusting potentiometer 26. This adjustment varies the D.C. voltage on the control coil 20 of the power reactor 10 to thereby vary the amount of D.C. saturation in the reactor cores and the A.C. reactance of load coils 18.

Resistor 28 is used to limit the maximum current output to rectifier bridge 30 so as not to exceed design ratings. Resistor 28 can be eliminated (see alternate connection shown in dotted lines) allowing increased current output when the design rating of rectifier 30 is suitable for such increased output.

The particular construction of saturable reactor 10 can vary to some extent. The preferred arrangement from both a cost and performance standpoint is to wind each load coil 18 on a C-core with the control coil 20 wound on one leg of each load coil C-core.

The control of the battery charging rate occurs as follows. Assume that a decrease in battery terminal voltage takes place, as it does during the initial stages of battery formation. The voltage at the output terminals of saturable reactor 10 decreases accordingly and less current flows in the control circuit 21 which means that there will be a decrease in the current flowing in control coil 20 of reactor 10. With less control coil current the impedance of load coils 18 of reactor 10 is increased resulting in an additional voltage drop across the saturable reactor terminals. Thus, it is seen that the increased voltage drop at reactor 10 offsets the lower voltage drop at the batteries and thereby tends to maintain the charge current at its original value. The above described action is reversed when a rise in battery voltage drop takes place as it does in the final stages of battery formation and when a formed battery is recharged from a discharged condition.

The degree of compensation provided by the action of control circuit 21 may be too little or too great and depends on the characteristics of the saturable reactor and other control circuit elements. In the control circuit described above the desired compensation is obtained by designing control transformer 22 to operate with core flux densities which run into the saturation region. A dropping resistor 24 in the control transformer primary is used to limit the current flow when the transformer core is in a saturated condition and the primary impedance is low. Due to transformer saturation and dropping resistor 24 the alternating voltage across potentiometer 26 bears a direct relationship to the voltage at the output of reactor 10. By correct design of control transformer 22 and dropping resistor 24, the voltage at potentiometer 26 will provide a saturable reactor control coil current which varies in a manner which will maintain a relatively constant charging rate under conditions of varying battery voltage.

Another circuit variable which can effect the charge rate is a variation in the A.C. line voltage. While it would be desirable to vary the control current in a manner which would compensate for line voltage variations, it is essential for successful rectifier operation that at the least the control current be held relatively constant in the presence of line voltage variations. This is accomplished in the present circuit by using the output terminals of saturable reactor 10 as the source of control voltage and by designing the control circuit components so that control transformer 22 will operate with core flux densities which run into the saturation region.

As stated previously, the alternating voltage at the output of reactor 10 is fixed by the voltage at battery 16. Assuming that an increase in line voltage does cause an increase in charge current, the voltage at the batteries (and at reactor 10) would rise only slightly because of the low internal resistance of the batteries. Furthermore, any increase in voltage at the output of reactor 10 would result in a lesser percentage increase in voltage at potentiometer 26 due to the fact that control transformer 22 is nearly saturated. Thus, it is seen that the control current flowing in control coil 20 is relatively insensitive to changes in the A.C. line voltage; that is, control circuit 21 tends to maintain the impedance of saturable reactor 10 constant under conditions of varying A.C. line voltage.

It is important to note in this regard that the source of control voltage is the output of the reactor as compared to a control voltage which might be obtained directly from the incoming power line. If the control circuit received its power directly from the line, the control current would increase in proportion to an increase in line voltage and thus an increase line voltage would result in a decreased saturable reactor impedance. The additional voltage available to drive current through the rectifier and battery load would then consist of the sum of the line voltage increase and the saturable reactor drop decrease. Such a control arrangement therefore would magnify the effect of line voltage change on charging current.

Although but one embodiment of the present invention has been illustrated and described, it will be apparent to those skilled in the art that various changes and modifications may be made therein without departing from the spirit of the invention or from the scope of the appended claims.

We claim:

1. A battery charging circuit comprising: a main charging circuit including a saturable reactor connected to a source of alternating current and a rectifier adapted to convert the alternating current output of said saturable reactor into direct current for charging a battery, said saturable reactor including at least one load coil and a control coil for said load coil; and a control circuit for said main charging circuit connected to the output of said saturable reactor, said control circuit including a control transformer having its primary connected to the output of said saturable reactor and in parallel with the battery to be charged, a dropping resistor in the primary of said control transformer and a control rectifier in the secondary of said control transformer to provide direct current to said saturable reactor control coil, said control coil being connected to the secondary of said control transformer and deriving its sole source of control current therefrom.

2. A battery charging circuit according to claim 1 in which said control transformer operates with core flux densities which run into the saturation region.

3. A battery charging circuit according to claim 2 in which there is a potentiometer connected in the secondary of said control transformer.

4. A battery charging circuit according to claim 1 in which said saturable reactor has a pair of load coils connected in series one in each side of the line.

References Cited in the file of this patent

UNITED STATES PATENTS

| | | |
|---|---|---|
| 1,716,798 | Schmidt | June 11, 1929 |
| 2,409,610 | Bixby | Oct. 22, 1946 |
| 2,523,472 | Leathers | Sept. 26, 1950 |